United States Patent [19]
Tanaka et al.

[11] Patent Number: 5,602,765
[45] Date of Patent: Feb. 11, 1997

[54] ADAPTIVE TRANSFER FUNCTION ESTIMATING METHOD AND ESTIMATING DEVICE USING THE SAME

[75] Inventors: Masashi Tanaka; Yutaka Kaneda, both of Tokorozawa; Shoji Makino, Machida; Yoichi Haneda; Junji Kojima, both of Tokyo, all of Japan

[73] Assignee: Nippon Telegraph and Telephone Corporation, Tokyo, Japan

[21] Appl. No.: 278,503

[22] Filed: Jul. 21, 1994

[30] Foreign Application Priority Data

Jul. 27, 1993 [JP] Japan .................................. 5-184742

[51] Int. Cl.$^6$ ............................................ G06F 17/10
[52] U.S. Cl. .................. 364/724.19; 364/553; 364/578; 364/724.17
[58] Field of Search .......................... 395/20; 364/553, 364/724.12, 724.17, 724.19, 578

[56] References Cited

U.S. PATENT DOCUMENTS

| | | | |
|---|---|---|---|
| 4,067,060 | 1/1978 | Poussart et al. | 364/553 |
| 4,811,261 | 3/1989 | Kobayashi et al. | 364/724.19 |
| 4,882,526 | 11/1989 | Iino et al. | 318/561 |
| 5,117,401 | 5/1992 | Feintuch | 367/135 |
| 5,187,692 | 2/1993 | Haneda et al. | 367/135 |

*Primary Examiner*—Robert W. Downs
*Assistant Examiner*—A. Katbab
*Attorney, Agent, or Firm*—Pollock, Vande Sande & Priddy

[57] ABSTRACT

In an adaptive estimation of an acoustic transfer function of an unknown system, a forward linear prediction coefficient vector a(k) of an input signal x(k), the sum of forward a posteriori prediction-error squares F(k), a backward linear prediction coefficient vector b(k) of the input signal x(k) and the sum of backward a posteriori prediction-error squares B(k) are computed. Letting a step size and a pre-filter deriving coefficient vector be represented by μ and f(k), respectively, a pre-filter coefficient vector g(k) is calculated by a recursion formula for the pre-filter coefficient vector g(h), which is composed of the following first and second equations:

$$g(k) = (1-\mu)\begin{bmatrix} 0 \\ f(k-1) \end{bmatrix} + \frac{a(k)^T e(k)}{F(k)} a(k)$$

$$\begin{bmatrix} f(k-1) \\ 0 \end{bmatrix} = g(k-1) - \frac{b(k-1)^T e(k-1)}{B(k-1)} b(k-1).$$

13 Claims, 8 Drawing Sheets

ADAPTIVE TRANSFER FUNCTION ESTIMATING METHOD AND ESTIMATING DEVICE USING THE SAME

BACKGROUND OF THE INVENTION

The present invention relates to a method for adaptively estimating, with a projection algorithm, a transfer function of an unknown system and its output in an acoustic canceller, active noise control or the like and an estimating device using such a method.

In the following description, time will be represented by a discrete time k. For example, the amplitude of a signal x at time k will be expressed by x(k). FIG. 1 is a diagram for explaining the estimation of the transfer function of an unknown system. Reference numeral 11 denotes a transfer function estimation part and 12 the unknown system, and reference character x(k) represents an input signal to the unknown system and y(k) an output signal therefrom. The transfer function h(k) of the unknown system is estimated using the input signal x(k) and the output signal y(k). FIG. 2 is a diagram for explaining an adaptive estimation of the transfer function. Reference numeral 21 denotes an estimated transfer function correcting vector calculation part, 22 an estimated transfer function correction part and 23 a convolution part, these parts constituting an estimated signal generation part 20. The transfer function h(k) of the unknown system 12 is estimated as a transfer function $\hat{h}(k)$ of an FIR filter of a tap number L which forms the convolution part 23. More specifically, coefficients $\hat{h}_1(k) \ldots \hat{h}_L(k)$ of the FIR filter are estimated. Let it be assumed that the "transfer function" and the "FIR filter coefficient" will hereinafter be construed as the same. For the sake of brevity, the filter coefficient is represented as an estimated transfer function vector $\hat{h}(k)$ defined by the following equation.

$$\hat{h}(k) = [\hat{h}_1(k), \hat{h}_2(k), \ldots, \hat{h}_L(k)]^T \quad (1)$$

where T represents a transpose.

In FIG. 2, the input signal x(k) to the unknown system 12 is fed to the convolution part 23 and a calculation is performed to obtain the estimated transfer function vector $\hat{h}(k)$ that minimizes an expected value which is the square of an error signal e(k) available from a subtractor 24 which detects a difference between an output $\hat{y}(k)$ from the convolution part 23 given by the following equation (2) and the output y(k) from the unknown system 12.

$$\hat{y}(k) = \hat{h}(k)^T x(k) \quad (2)$$

$$x(k) = [x(k), x(k-1), \ldots, x(k-L+1)]^T \quad (3)$$

where $\hat{y}(k)$ is an estimated value of the output from the unknown system, which is close to the value of the output y(k) when the estimated transfer function $\hat{h}(k)$ is close to an unknown characteristic.

In practice, the transfer function of an unknown system often varies with time as in the case where the transfer function of an acoustic path varies with movement of audiences or objects in a sound field such as a conference hall or theater. For this reason, the estimated transfer function $\hat{h}(k)$ of the unknown system also needs to be adaptively corrected in accordance with a change in the acoustic path of the unknown system. The estimated transfer function correcting vector calculation part 21 calculates an estimated transfer function correcting vector $\delta\hat{h}(k)$ on the basis of the error signal e(k) and the input signal x(k) to the unknown system 12. The estimated transfer function correction part 22 corrects the estimated transfer function by adding the estimated transfer function correcting vector $\delta\hat{h}(k)$ to the estimated transfer function vector $\hat{h}(k)$ as expressed by the following equation.

$$\hat{h}(k+1) = \hat{h}(k) + \mu\delta\hat{h}(k) \quad (4)$$

where $\mu$ is called a step size, which is a preselected quantity for controlling the range of each correction and is handled as a time-invariant constant. In the following description, the estimated transfer function correcting vector $\delta\hat{h}(k)$ is calculated for $\mu=1$ and, if necessary, it is multiplied by a desired step size $\mu$. In some applications the value of the step size $\mu$ is caused to vary with time, but in such a case, too, the following description is applicable. The corrected estimated transfer function vector is transferred to the convolution part 23. The above is a transfer function estimating operation at time k and the same operation is repeated after time k+1 as well.

The estimated transfer function correcting method described above in respect of FIG. 2 is known as an adaptive algorithm. While an LMS (Least Mean Square) algorithm and an NLMS (Normalized LMS) are also well-known as adaptive algorithms, a description will be given of a projection algorithm proposed in a literature [Ozeki and Umeda: "An Adaptive Filtering Algorithm Using an Orthogonal Projection to an Affine Subspace and Its Properties", Journal of Institute of Electronics, Information and Communication Engineers of Japan (A), J67-App. 126–132, (1984-2).]

The projection algorithm requires a larger number of operations than does the NLMS but has an excellent adaptability to a speech signal input. With the projection algorithm, as referred to above, the vector $\delta\hat{h}(k)$ is determined by Eq. (4) for $\mu=1$ so that simultaneous equations composed of the following p equations are satisfied.

$$\begin{aligned} y(k) &= x(k)^T(\hat{h}(k) + \delta\hat{h}(k)) \\ y(k-1) &= x(k-1)^T(\hat{h}(k) + \delta\hat{h}(k)) \\ &\vdots \\ y(k-p+1) &= x(k-p+1)^T(\hat{h}(k) + \delta\hat{h}(k)) \end{aligned} \quad (5)$$

Eq. (5) indicates that the vector $\delta\hat{h}(k)$ is determined so that the estimated transfer function $\hat{h}(k+1)$ updated at time k provides the same values y(k), y(k-1), ..., y(k-p+1) as the outputs from the unknown system, respectively, for p input vectors x(k), x(k-1), ..., x(k-p+1) prior to time k. By this, it is expected that the characteristic of the estimated transfer function $\hat{h}(k)$ will approach the characteristic of the unknown system as the adaptive updating of the estimated transfer function is repeated using the vector $\delta\hat{h}(k)$.

In the above, p is a quantity commonly called a projection order. As the projection order p increases, the adaptability of the projection algorithm increases but the computational complexity also increases. The conventional NLMS method corresponds to the case of p=1.

Now, transposing the first equation in Eq. (5), we have $$x(k)^T \delta\hat{h}(k) = y(k) - x(k)^T \hat{h}(k) = e(k) \quad (6)$$

Furthermore, transposing the second equation in Eq. (5) and using an equation obtainable by setting k in Eqs. (4) and (6) to k–1, we have $$\begin{aligned}
x(k-1)^T\hat{\delta h}(k) &= y(k-1)-x(k-1)^T\hat{h}(k) \quad (7)\\
&= y(k-1)-x(k-1)^T(\hat{h}(k-1)+\\
&\quad \mu\hat{\delta h}(k-1))\\
&= y(k-1)-x(k-1)^T\hat{h}(k-1)+\\
&\quad \mu x(k-1)^T\hat{\delta h}(k-1)\\
&= e(k-1)-\mu e(k-1)\\
&= (1-\mu)e(k-1)
\end{aligned}$$

Thereafter, the following relationship similarly holds.

$$x(k-i)^T\hat{\delta h}(k)=(1-\mu)^i e(k-i) \quad (8)$$

Based on this, Eq. (5) can be rewritten as the following system of simultaneous equations.

$$X_p(k)\hat{\delta h}(k)=e(k) \quad (9)$$

where $X_p(k)$ is a matrix with p rows and L columns and $e(k)$ is a vector of the p rows; they are defined by the following equations.

$$X_p(k) = \begin{bmatrix} x(k)^T \\ x(k-1)^T \\ \vdots \\ x(k-p+1)^T \end{bmatrix} \quad (10)$$

$$e(k) = \begin{bmatrix} e(k) \\ (1-\mu)e(k-1) \\ \vdots \\ (1-\mu)^{p-1}e(k-p+1) \end{bmatrix} \quad (11)$$

The vector $e(k)$ will hereinafter be referred to as an error vector. Now, since p is usually smaller than L, Eq. (9) is an under-determined simultaneous equation or indeterminate equation for the vector $\hat{\delta h}(k)$ and the minimum norm solution of the vector $\hat{\delta h}(k)$ is given by the following equation.

$$\begin{aligned}
\hat{\delta h}(k) &= X_p(k)^T(X_p(k)X_p(k)^T)^{-1}e(k) \quad (12)\\
&= [x(k)x(k-1),\ldots,x(k-p+1)]g(k)
\end{aligned}$$

where $$g(k)=R_p(k)^{-1}e(k) \quad (13)$$

$$R_p(k)=X_p(k)X_p(k)^T \quad (14)$$

$R_p$ is a matrix with p rows and p columns, which will hereinafter be referred to as a p-order covariance matrix or auto-correlation matrix, and $g(k)$ a pre-filter coefficient vector. Letting elements of the pre-filter coefficient vector $g(k)$ be represented by $g_1(k), g_2(k), \ldots, g_p(k)$, the estimated transfer function correcting vector $\hat{\delta h}(k)$ can be expressed on the basis of Eq. (12) as follows:

$$\hat{\delta h}(k) = \sum_{i=1}^{p} g_i(k)x(k-i+1) \quad (15)$$

When, when the projection algorithm is used in accordance with the present invention, the estimated transfer function correcting vector calculation part 21 in FIG. 2 has such a construction as depicted in FIG. 3. Reference numeral 31 denotes a pre-filter coefficient vector calculation part, which uses the input signal $x(k)$ and the error signal $e(k)$ to calculate the pre-filter coefficient $g(k)$ on the basis of Eq. (13). Reference numeral 32 denotes a pre-filtering part, which performs the pre-filtering operation expressed by Eq. (15) to synthesize the estimated transfer correcting vector $\hat{\delta h}(k)$ by use of the pre-filter coefficient $g(k)$ that is transferred from the pre-filter coefficient vector calculation part 31.

Now, a description will be given of the computational complexity of the projection scheme described above. The computational complexity mentioned herein is the number of multiplication-addition (or addition) operations necessary for estimating operations per unit discrete time. The computational complexity of Eq. (2) in the convolution part 23 of the tap number L in FIG. 2 is L. The computational complexity of Eq. (13) in the pre-filter coefficient vector calculation part 31 of the estimated transfer function correcting vector calculation part 21 is about $p^3/6$ when using the Choleski method which is a typical computation method. The computational complexity of Eq. (15) in the pre-filtering part 32 is $(p-1)L$. The computational complexity of Eq. (4) in the estimated transfer function correction part 22 is L. Thus, the entire computational complexity NC of the projection scheme is given by the following equation.

$$NC=L+p^3/6+(p-1)L+L \quad (16)$$

On the other hand, the computational complexity of the NLMS scheme or LMS algorithm is about 2L. For example, when L=500 and p=20 (a typical value in the case of an acoustic echo canceler), the number of operations involved in the NLMS scheme is 1000, whereas the projection scheme requires as many as about 12000 operations on the basis of Eq. (16). The computational complexity $p^3/6$ of Eq. (13), in particular, abruptly increases as the projection order p increases. Thus, the projection scheme has excellent convergence characteristics as compared with the NLMS scheme but poses the problem of increased computational complexity.

SUMMARY OF THE INVENTION

It is therefore an object of the present invention to provide an adaptive transfer function estimating method which permits reduction of the computational complexity involved and an estimating device using such a method.

To attain the above objective, the present invention reduces the computational complexity of the pre-filter coefficient vector calculation part 31 according to its first aspect and the computational complexity of the pre-filtering part 32 according to its second aspect.

According to the first aspect of the present invention, the adaptive transfer function estimating method or device which employs the projection algorithm and in which:

the transfer function of an unknown system is estimated using an input signal $x(k)$ and an output signal $y(k)$ of the unknown system at a discrete time k;

an error signal $e(k)=y(k)-\hat{y}(k)$ is calculated between an output signal $\hat{y}(k)$ of an estimated system having the estimated transfer function $\hat{h}(k)$ and the output signal $y(k)$ of the unknown system;

letting the vector of the error signal $e(k)$, a covariance matrix of the input signal $x(k)$ and the vector of pre-filter coefficients be represented by $e(k)$, $R_p(k)$ and $g(k)$, respectively, the following simultaneous linear equation with p unknowns $$R_p(k)g(k)=e(k)$$

is solved to obtain the pre-filter coefficient vector g(k), and the pre-filter coefficient vector g(k) is used to calculate an estimated transfer function correcting vector $\delta\hat{h}(k)$ by the following equation $$\delta\hat{h}(k)=[x(k), x(k-1), \ldots, x(k-p+1)]g(k);$$

and the estimated transfer function correcting vector $\delta\hat{h}(k)$ and a predetermined correcting step size μ are used to repeatedly correct the estimated transfer function vector $\hat{h}(k)$ by the following equation $$\hat{h}(k+1)=\hat{h}(k)+\mu\delta\hat{h}(k)$$

so that the error signal e(k) approaches zero;
characterized in that a forward linear prediction coefficient vector a(k) of the input signal x(k), the sum of its a posteriori prediction-error squares F(k), a backward linear prediction coefficient vector b(k) of the input signal x(k) and the sum of its a posteriori prediction-error squares B(k) are computed and, letting a pre-filter deriving coefficient vector be represented by f(k), the pre-filter coefficient vector g(k) is obtained by a recursive formula composed of the following first and second equations:

$$g(k) = (1-\mu)\begin{bmatrix} 0 \\ f(k-1) \end{bmatrix} + \frac{a(k)^T e(k)}{F(k)} a(k)$$

$$\begin{bmatrix} f(k-1) \\ 0 \end{bmatrix} = g(k-1) - \frac{b(k-1)^T e(k-1)}{B(k-1)} b(k-1)$$

According to the second aspect of the present invention, the adaptive transfer function estimating method or device which employs the projection algorithm and in which:

the transfer function of an unknown system is estimated using an input signal x(k) and an output signal y(k) of the unknown system at a discrete time k;

an error signal $e(k)=y(k)-\hat{y}(k)$ is calculated between an output signal $\hat{y}(k)$ of an estimated system having the estimated transfer function $\hat{h}(k)$ and the output signal y(k) of the unknown system;

letting the vector of the error signal e(k), a covariance matrix of the input signal x(k) and the vector of a pre-filter coefficient be represented by e(k), $R_p(k)$ and g(k), respectively, the following simultaneous linear equation with p unknowns $$R_p(k)g(k)=e(k)$$

is solved to obtain the pre-filter coefficient vector g(k), and the pre-filter coefficient vector g(k) is used to calculate an estimated transfer function correcting vector $\delta\hat{h}(k)$ by the following equation $$\delta\hat{h}(k)=[x(k), x(k-1), \ldots, x(k-P+1)]g(k);$$

and the estimated transfer function correcting vector $\delta\hat{h}(k)$ and a predetermined correcting step size μ are used to repeatedly correct the estimated transfer function vector $\hat{h}(k)$ by the following equation $$\hat{h}(k+1)=\hat{h}(k)+\mu\delta\hat{h}(k)$$

so that the error signal e(k) approaches zero;
characterized in that:
instead of calculating said correcting vector $\delta\hat{h}(k)$, pre-filter coefficients $g_i(k)$ which are elements of the pre-filter coefficient vector g(k) are smoothed by the following equation $$\begin{aligned} s_i(k) &= s_{i-1}(k-1) + \mu g_i(k) & \text{for } 2 \leq i \leq p \\ &= \mu g_1(k) & \text{for } i = 1 \end{aligned}$$

to obtain a smoothing coefficient $s_i(k)$;
instead of correcting said estimated transfer function vector, the smoothing coefficient $s_p(k)$ is used to obtain an approximate estimated transfer function z(k+1) by the following equation $$z(k+1)=z(k)+s_p(k)x(k-p+1);$$

a convolution $x(k)^T z(k)$ between the approximate estimated transfer function z(k+1) and the input signal x(k) is performed;

an inner product $s_{p-1}(k-1)^T r_{p-1}(k)$ is calculated, setting the vector of the smoothing coefficient $s_i(k)$, the vector of the input signal x(k) and the correlation vector of the input signal as follows:

$$s_{p-1}(k-1)=[s_1(k-1), s_2(k-1), \ldots, s_{p-1}(k-1)]^T$$

$$r_{p-1}(k)=[x(k)^T x(k-1), x(k)^T x(k-2), \ldots, x(k)^T x(k-p+1)]^T;$$

and
the sum of the convolution result $x(k)^T z(k)$ and the inner product is output as the estimated signal $\hat{y}(k)$.

DESCRIPTION OF THE PREFERRED EMBODIMENTS

Figure 1:
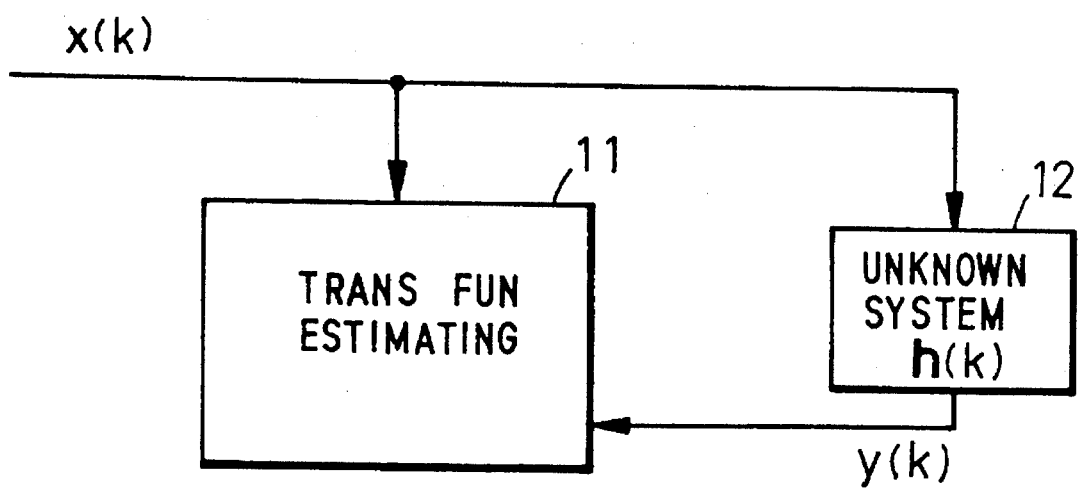
FIG. 1 is a block diagram illustrating an ordinary construction for the estimation of a transfer function.

A description will be given first of a method for reducing the computational complexity of the pre-filter coefficient vector calculation part 31. This method is characterized in that the pre-filter coefficient vector g(k) is obtained by a recursion formula utilizing a vector g(k−1) at one unit time before. Now, it will be demonstrated how the vector g(k) can be obtained from the immediately preceding vector g(k−1) on a recursive basis. The recursion formula is derived through utilization of the fact that elements of the error vector e(k) of Eq. (11) shift with time while being multiplied by 1−μ and the property of the inverse of the covariance matrix of the input signal given by Eq. (14).

As is the case with Eq. (14), a covariance matrix $R_{p-1}(k)$ of the p−1 order is defined by the following equation.

$$R_{p-1}(k) = X_{p-1}(k)X_{p-1}(k)^T = \begin{bmatrix} x(k)^T \\ x(k-1)^T \\ \vdots \\ x(k-p+2)^T \end{bmatrix} [x(k)x(k-1), \ldots, x(k-p+2)] \quad (17)$$

It is known from a literature, S. Haykin, "Adaptive Filter Theory," 2nd edition, Prentice-Hall, 1991, pp. 577–578 that the inverse of the covariance matrix $R_p(k)$ and the inverse of the covariance matrix $R_{p-1}(k)$ bear such a relationship as shown below.

$$R_p(k)^{-1} = \begin{bmatrix} 0 & \cdots & 0 \\ \vdots & R_{p-1}(k-1)^{-1} & \vdots \\ 0 & & \end{bmatrix} + \frac{a(k)a(k)^T}{F(k)} \quad (18)$$

$$R_p(k-1)^{-1} = \begin{bmatrix} & & 0 \\ R_{p-1}(k-1)^{-1} & & \vdots \\ 0 & \cdots & 0 \end{bmatrix} + \frac{b(k-1)b(k-1)^T}{B(k-1)} \quad (19)$$

where a(k) is a forward linear prediction coefficient vector (p-order) which satisfies a normal equation $R_p(k)a(k) = [F(k), 0, \ldots, 0]^T$ and its first element is a 1; F(k) is the minimum value of the sum of forward a posteriori prediction-error squares; b(k−1) is a backward linear prediction coefficient vector (p-order) which satisfies a normal equation $R_p(k-1)b(k-1) = [0, \ldots, 0, B(k-1)]^T$ and its last element is a 1; and B(k−1) is the minimum value of the sum of backward a posteriori prediction-error squares. The linear prediction coefficients a(k), b(k−1) and the minimum values of the sums of forward and backward a posteriori prediction-error squares F(k) and B(k−1) could be calculated with less computational complexity through use of an FTF (Fast Transversal Filters) algorithm, for instance, as disclosed in J. M. Cioffi and T. Kailath, "Windowed fast transversal adaptive filter algorithms with normalization," IEEE Trans. Acoust, Speech Signal Processing, vol. ASSP-33, no. 3, pp. 607–625. The pre-filter coefficient vector g(k) of Eq. (13) is shown again below.

$$g(k) = R_p(k)^{-1}e(k) \quad (20)$$

A pre-filter deriving coefficient vector f(k) of p−1 order is defined, corresponding to the vector g(k), by the following equation.

$$f(k) = R_{p-1}(k)^{-1}e_{p-1}(k) \quad (21)$$

where $$e_{p-1}(k) = \begin{bmatrix} e(k) \\ (1-\mu)e(k-1) \\ \vdots \\ (1-\mu)^{p-2}e(k-p+2) \end{bmatrix} \quad (22)$$

Since all elements of a vector $(1-\mu)e_{p-1}(k-1)$ of p−1 order, obtained by substituting (k−1) for k in Eq. (22) and multiplying both of its left and right sides by (1−μ), constitute elements of the p-order vector e(k) of Eq. (11) except its first element e(k), the relationship of the following equation holds.

$$e(k) = \begin{bmatrix} e(k) \\ (1-\mu)e_{p-1}(k-1) \end{bmatrix} \quad (23)$$

Furthermore, since all the elements of the p−1 order vector of Eq. (22) constitute all elements of the p-order vector of Eq. (11) except its last element, the relationship between the vectors e(k) and $e_{p-1}(k)$ can also be expressed as follows:

$$e(k) = \begin{bmatrix} e_{p-1}(k) \\ (1-\mu)^{p-1}e(k-p+1) \end{bmatrix} \quad (24)$$

Multiplying the respective terms on both sides of Eq. (18) by e(k) from the right, we obtain the following equation from Eqs. (20), (21) and (23), $$g(k) = (1-\mu)\begin{bmatrix} 0 \\ f(k-1) \end{bmatrix} + \frac{a(k)^T e(k)}{F(k)} a(k) \quad (25)$$

Moreover, multiplying both sides of Eq. (19) by e(k−1) from the right, we obtain the following equation from Eqs. (20), (21) and (24).

$$g(k-1) = \begin{bmatrix} f(k-1) \\ 0 \end{bmatrix} + \frac{b(k-1)^T e(k-1)}{B(k-1)} b(k-1) \quad (26)$$

Transposing the right side to the left side, we have $$\begin{bmatrix} f(k-1) \\ 0 \end{bmatrix} = g(k-1) - \frac{b(k-1)^T e(k-1)}{B(k-1)} b(k-1) \quad (27)$$

In this way, the pre-filter coefficient vector g(k) is calculated on the basis of the value of the pre-filter deriving coefficient vector f(k−1) as expressed by Eq. (25), and the vector f(k−1) is calculated from the vector g(k−1) as expressed by Eq. (27). That is, Eqs. (25) and (27) are recursion formulae for the vector g(k).

On the right side of Eq. (25), to obtain the first term (1−μ) [] needs p−1 multiplications, to obtain e(k) needs p−1 multiplications and to obtain the second term $a(k)^T e(k)$ needs p multiply-add operations, one division for division by F(k) and p multiply-add operations for multiplication by a(k) and addition to the first term on the right side. That is, a total of 4p operations are needed. Similarly, approximately 2p operations are required to obtain Eq. (27). Accordingly, the number of operations of Eqs. (25) and (27) is around 6p, which is a computational complexity proportional to p. On the other hand, it is disclosed in the aforementioned literature by J. M. Cioffi and T. Kailath that the linear prediction coefficient vectors a(k), b(k−1) and the minimum values of the sum of a posteriori prediction-error squares F(k), B(k−1), which are needed in Eqs. (25) and (27), can be calculated by a linear prediction scheme with a computational complexity of about 10p. Thus, it is evident that the recursion formulae of Eqs. (25) and (27) permits calculation of the vector g(k) with the computational complexity proportional to the projection order p.

According to the present invention based on the above-described principles, the matters (A), (B) and (C) listed below are effective in reducing the computational complexity and in increasing the computational stability.

(A) Eq. (27) is an equation for the p-order vector and its left side is zero with respect to a p-th element (the least significant element) of the vector. Since a p-th element of the vector b(k−1) is always a 1, the following equation holds using a p-element $g_p(k−1)$ of the vector g(k−1).

$$\frac{b(k-1)^T e(k-1)}{B(k-1)} = g_p(k-1) \tag{28}$$

Therefore, the following equation may be calculated in place of Eq. (27).

$$\begin{bmatrix} f(k-1) \\ 0 \end{bmatrix} = g(k-1) - g_p(k-1)b(k-1) \tag{27a}$$

In this case, however, taking computational errors into account, it may sometimes be advantageous to obtain both $g_p(k−1)$ and the left side of Eq. (28) and average them.

(B) When denominators F(k) and B(k−1) of the second terms on the right sides of Eqs. (25) and (27) are small, operations are unstable. The computational instability could be reduced by adding non-negative $\delta_F(k)$ and $\delta_B(k−1)$ to the denominators as shown in the following equations.

$$g(k) = (1-\mu)\begin{bmatrix} 0 \\ f(k-1) \end{bmatrix} + \frac{a(k)^T e(k)}{F(k)+\delta_F(k)} a(k) \tag{29}$$

$$\begin{bmatrix} f(k-1) \\ 0 \end{bmatrix} = g(k-1) - \frac{b(k-1)^T e(k-1)}{B(k-1)+\delta_B(k-1)} b(k-1) \tag{30}$$

In practice, the values $\delta_F(k)$ and $\delta_B(k−1)$ may be set to desired values about 40 dB smaller than the average power of the input signal x(k) (that is, about 1/10000 the average power) or may also be varied with time k in accordance with power variations.

(c) In linear prediction analysis for obtaining the linear prediction coefficient vectors a(k), b(k−1) and the minimum values of the sum of prediction-error squares F(k), B(k−1) which are needed in Eqs. (25) and (27), the analysis frame of the input signal x(k) differs from that in an ordinary case. In concrete terms, the analysis frame in an ordinary linear prediction analysis ranges from time 0 to the current time, and when time k−1 is updated to k, x(k) needs only to be added to the analysis frame. In the projection algorithm, the analysis frame ranges from x(k) to x(k−L−p+2) in Eq. (5); so that when time k−1 is updated to k, it is necessary not only to add x(k) to the analysis frame but also to remove x(k−L−p+1). On this account, the linear prediction analysis in the projection algorithm requires computational complexity twice that needed for ordinary linear prediction analysis. However, when the statistical property of the input signal does not change or when it is expected that its change is slow, the result of the linear prediction analysis does not largely depend on the analysis frame; hence, it is possible to use the ordinary linear prediction analysis in which x(k) needs only to be added to the analysis frame at time k—this permits reduction of the computational complexity.

Figure 2:
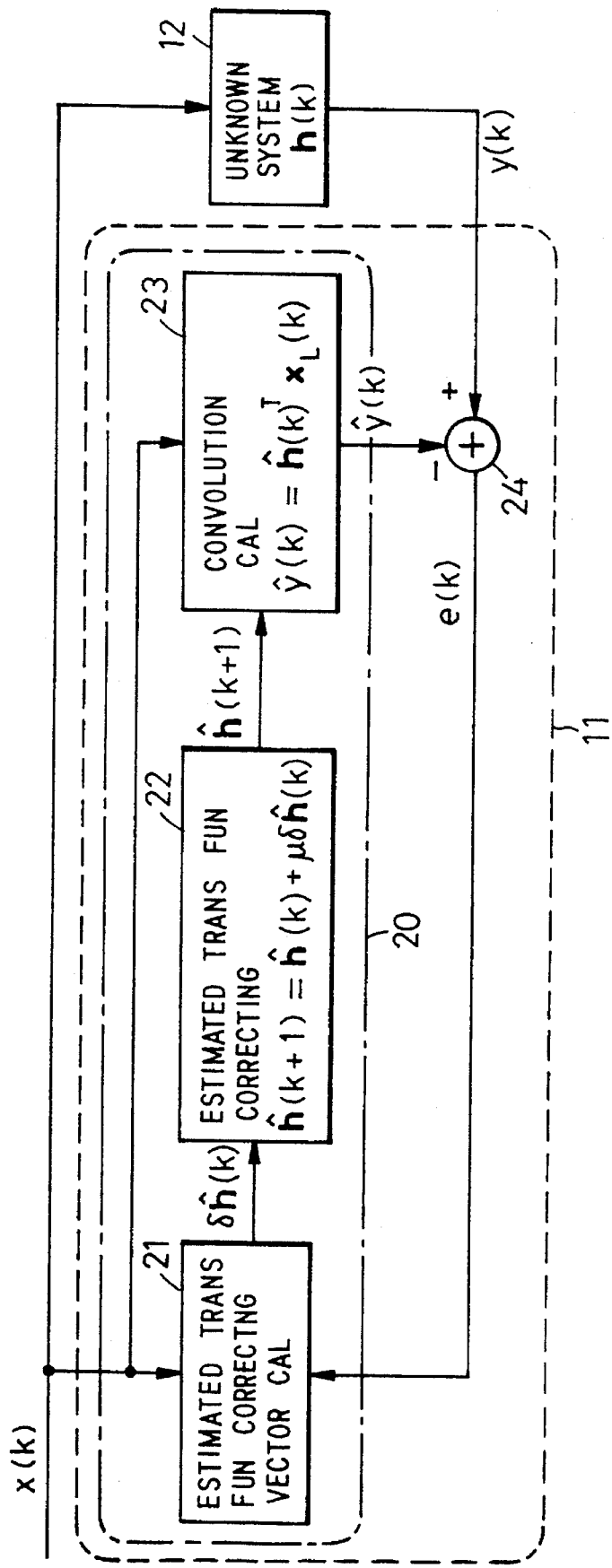
FIG. 2 is a block diagram of a transfer function estimation part 11 in FIG. 1.
Figure 3:
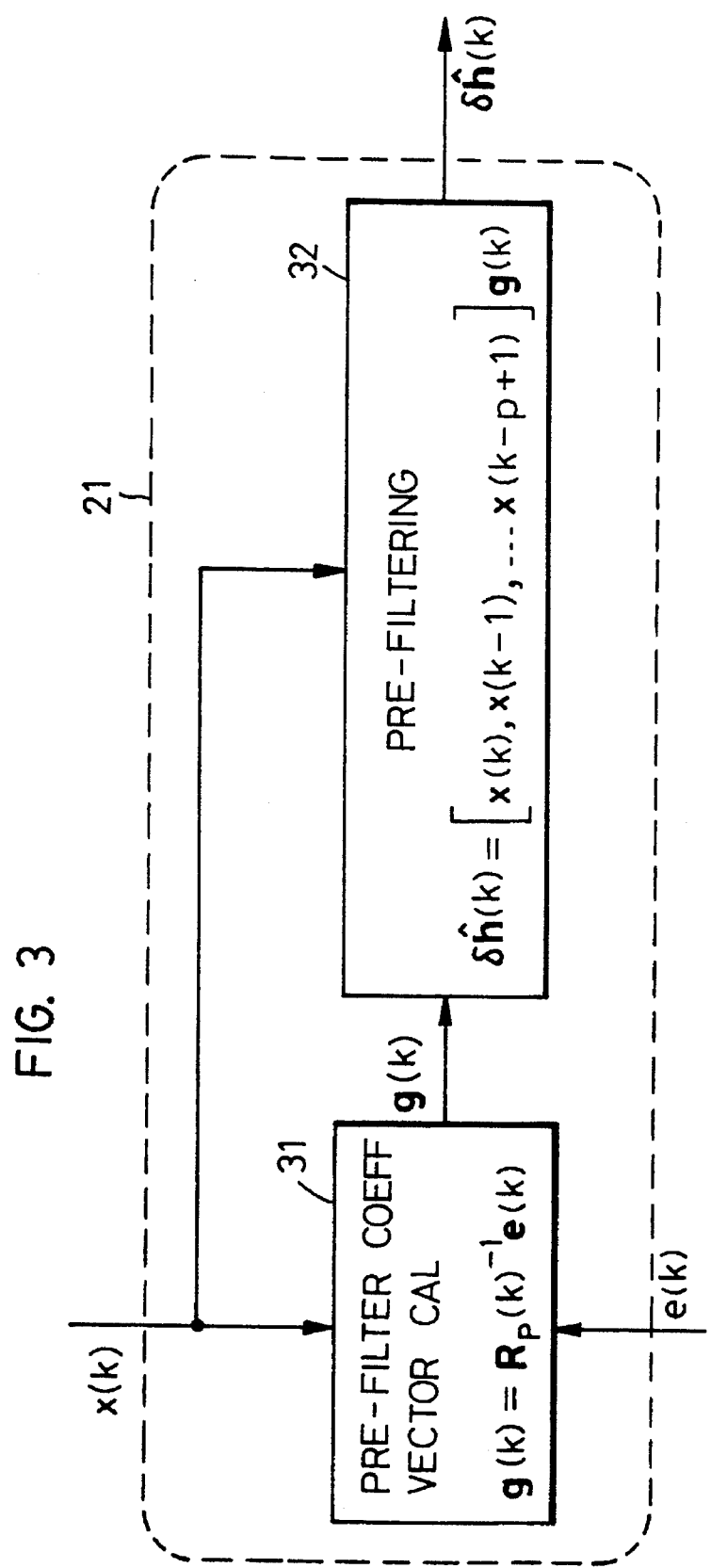
FIG. 3 is a block diagram of an estimated transfer function correcting vector calculation part 21 embodying the present invention in FIG. 2.

Next, a description will be given of an embodiment of the adaptive transfer function estimating method of the present invention based on the abovedescribed theoretical discussions, reference being made to FIG. 2 because the overall construction of its functional block is the same as shown in FIG. 2. Since the abovedescribed theory underlying the present invention is related to the reduction of computational complexity in the estimated transfer function correcting vector calculation part 21 in FIG. 2, in particular, in the pre-filter coefficient vector calculation part 31 and the pre-filtering part 32 depicted in FIG. 3, these parts will hereinbelow be described in detail.

Figure 4:
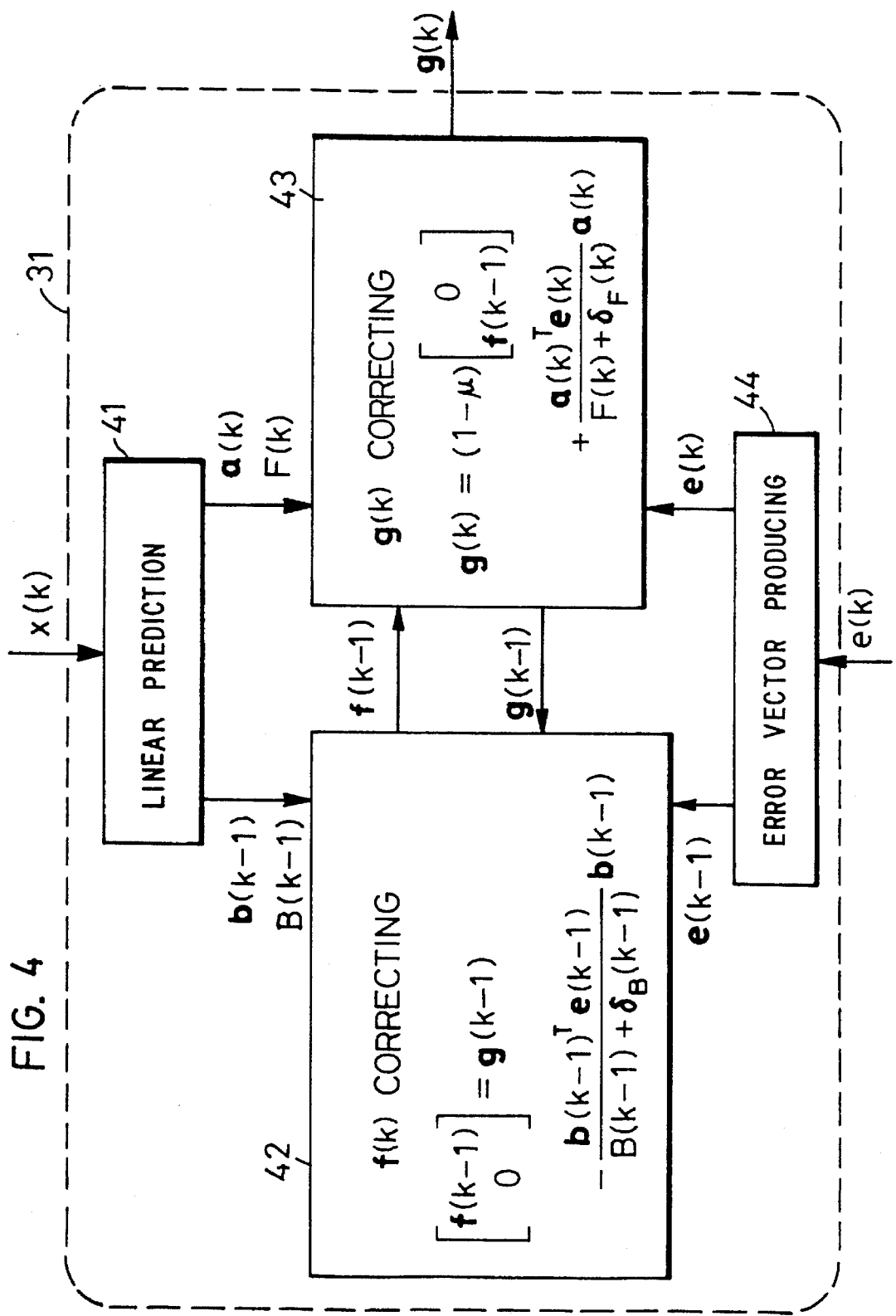
FIG. 4 is a block diagram of a pre-filter coefficient vector calculation part 31 according to the first aspect of the invention in FIG. 3.

FIG. 4 illustrates in block form the pre-filter coefficient vector calculation part 31 based on the discussion above. Reference numeral 41 denotes a linear prediction part, 42 a pre-filter deriving coefficient vector correcting part, 43 a pre-filter coefficient vector correcting part, and 44 an error vector generating part. The linear prediction part 41 calculates the forward linear prediction coefficient vector a(k) which satisfies a normal equation $R_p(k)a(k)=[F(k), 0, \ldots 0]^T$ and the sum of forward a posteriori prediction-error squares F(k) when the prediction coefficient a(k), the backward linear prediction coefficient vector b(k) which satisfies a normal equation $R_p(k-1)b(k-1)=[0, \ldots, 0, B(k-1)]^T$ and the sum of backward a posteriori prediction-error squares B(k) when the prediction coefficient b(k) is used. These values can be calculated by methods disclosed in the aforementioned literature by J. M. Cioffi et al. The error signal vector generating part 44 stores p error signals e(k), e(k−1), ..., e(k−p+1) and constitutes the error signal vector e(k) of Eq. (11). In the pre-filter deriving coefficient vector correcting part 42, the pre-filter coefficient vector g(k−1), the backward linear prediction coefficient vector b(k−1), the error signal vector e(k−1) and the minimum value of the sum of backward a posteriori prediction-error squares B(k−1) are used to compute the pre-filter deriving coefficient vector f(k−1) on the basis of Eq. (27) or (30). In the pre-filter coefficient vector correcting part 43, the pre-filter deriving vector f(k−1), the error signal vector e(k), the forward linear prediction coefficient vector a(k) and the minimum value of the sum of forward a posteriori prediction-error squares F(k) are used to compute, by Eq. (25) or (29), the vector g(k) that satisfies Eq. (13).

With the methods mentioned above, the computational complexity involved in the pre-filter coefficient vector calculation part 31 can substantially be reduced from $p^3/6$ to 15p. Since the computational complexity (p−1)L in the pre-filtering part 32 remains unsolved, a large number of operations are still needed when L is large.

Next, a description will be given of a solution to the above-noted problem by storing approximate values of the estimated transfer function vector $\hat{h}(k+1)$ and averaging pre-filtering coefficients.

At first, substituting k−1 for k in Eq. (4), the estimated transfer function $\hat{h}(k)$ is expressed as follows:

$$\hat{h}(k)=\hat{h}(k-1)+\mu\delta\hat{h}(k-1) \tag{31}$$

Substituting this in Eq. (4), the estimated transfer function $\hat{h}(k+1)$ is expressed as follows:

$$\hat{h}(k+1)=\hat{h}(k-1)+\mu\delta\hat{h}(k)+\mu\delta\hat{h}(k-1) \tag{32}$$

Setting k−2, k−3, ... for k in Eq. (4) and repeating the above substitution, the estimated transfer function $\hat{h}(k+1)$ is expressed by $$\hat{h}(k+1)=\mu\delta\hat{h}(k)+\mu\delta\hat{h}(k-1)+\ldots+\mu\delta\hat{h}(0) \tag{33}$$

In this instance, the estimated initial value $\hat{h}(0)$ is set to 0 and this equation reveals that the estimated transfer function $\hat{h}(k+1)$ is a summation of correcting vectors $\mu\delta\hat{h}(k)$, $\mu\delta\hat{h}(k-1)$, ..., $\mu\delta\hat{h}(0)$ from time 0 (the transfer function estimation starting time) to the current time k.

The correcting vector $\mu\delta\hat{h}(k)$ is expressed by Eq. (15). Setting k−1, k−2, ..., for k in Eq. (15) and substituting Eq. (15) in Eq. (33), we get $$\begin{aligned}\hat{h}(k+1) &= \mu[\{g_1(k)x(k)+g_2(k)x(k-1)+\ldots+ \\ & g_p(k)x(k-p+1)\}+\{g_1(k-1)x(k-1)+ \\ & g_2(k-1)x(k-2)+\ldots+g_p(k-1)x(k-p)\}+ \\ & \ldots+\{g_1(0)x(0)+g_2(0)x(-1)+\ldots+ \\ & g_p(0)x(-p+1)\}] \\ &= \mu[g_1(k)x(k)+\{g_2(k)+g_1(k-1)\}x(k-1)+ \\ & \{g_3(k)+g_2(k-1)+g_1(k-2)\}x(k-2)+\ldots+ \\ & \{g_{p-1}(k)+g_{p-2}(k-1)+\ldots+ \\ & g_1(k-p+2)\}x(k-p+2)+\{g_p(k)+ \\ & g_{p-1}(k-1)+\ldots+g_2(k-p+2)+ \\ & g_1(k-p+1)\}x(k-p+1)+\{g_p(k-1)+ \\ & g_{p-1}(k-2)+\ldots+g_2(k-p+1)+ \\ & g_1(k-p)\}x(k-p)+\{g_p(k-2)+ \\ & g_{p-1}(k-3)+\ldots+g_2(k-p)+ \\ & g_1(k-p-1)\}x(k-p-1)+\ldots\end{aligned}$$ (34)

From this equation the following facts are expected. Firstly, the pre-filter coefficient $g_i(k)$ is calculated at every time k in the pre-filter coefficient calculation part 31 in FIG. 3 and provided to the pre-filtering part 32; in this case, it is expected that the computational complexity would be reduced by smoothing (or averaging) the pre-filter coefficient $g_i(k)$. Secondly, the term $+g_p(k-1)+\ldots$ and the subsequent terms in Eq. (34) do not involve the pre-filter coefficient $g_i(k)$ which is fed at time k, and hence this portion does not change after time k. By storing these terms as approximate values of the vector $\hat{h}(k+1)$, it is expected that the computational complexity would be reduced accordingly, because no calculations are needed for these terms after time k.

Next, the above will be expressed by mathematical formulae. The smoothing of the pre-filter coefficient takes place for each corresponding input vector $x(k-i)$. From Eq. (34), the smoothing corresponding to the input vector $x(k-1)$, for example, is $g_2(k)+g_1(k-1)$, and the smoothing corresponding to the input vector $x(k-2)$ is $g_3(k)+g_2(k-1)+g_1(k-2)$. Letting the result of averaging (a smoothing coefficient) corresponding to the input vector $x(k-i+1)$, inclusive of the constant $\mu$, be represented by $s_i(k)$, it is expressed by $$s_i(k) = \mu \sum_{j=0}^{i-1} g_{i-j}(k-j) \text{ for } 1 \leq i \leq p \quad (35)$$

$$s_i(k) = \mu \sum_{j=i-p}^{i-1} g_{i-j}(k-j) \text{ for } p < i \quad (36)$$

Eq. (35) is expressed as follows:

$$\begin{aligned}s_i(k) &= \mu \sum_{j=1}^{i-1} g_{i-j}(k-j)+\mu g_i(k) \\ &= \mu \sum_{j=0}^{i-2} g_{i-j-1}(k-j-1)+\mu g_i(k) \\ &= s_{i-1}(k-1)+\mu g_i(k) \quad \text{for } 2 \leq i \leq p \\ &= \mu g_i(k) \quad \text{for } i=1\end{aligned}$$ (37)

On the other hand, letting the approximate value of the estimated transfer function $\hat{h}(k+1)$ be represented by $z(k+1)$, it is expressed by $$z(k+1) = \{g_p(k)+g_{p-1}(k-1)+\ldots+g_2(k-p+2)+ \quad (38)$$

$$g_1(k-p+1)\}x(k-p+1)+\{g_p(k-1)+$$

$$g_{p-1}(k-2)+\ldots+g_2(k-p+1)+g_1(k-p)\}x(k-p)+$$

$$\{g_p(k-2)+g_{p-1}(k-3)+\ldots+g_2(k-p)+$$

$$g_1(k-p-1)\}x(k-p-1)+\ldots$$

From Eqs. (34), (35) and (38) we have the estimated transfer function $\hat{h}(k+1)$ expressed as follows:

$$\hat{h}(k+1) = z(k+1) + \sum_{i=1}^{p-1} s_i(k)x(k-i+1) \quad (39)$$

Moreover, the following relationship holds between the approximate values $z(k+1)$ and $z(k)$.

$$\begin{aligned}z(k+1) &= \{g_p(k)+g_{p-1}(k-1)+\ldots+ \\ & g_2(k-p+2)+ \\ & g_1(k-p+1)\}x(k-p+1)+z(k) \\ &= s_p(k)x(k-p+1)+z(k)\end{aligned}$$ (40)

The estimated value $\hat{y}(k)$ of the output from the unknown system is expressed, from Eqs. (2) and (39), as follows:

$$\begin{aligned}\hat{y}(k) &= x(k)^T\hat{h}(k) \\ &= x(k)^T\left\{z(k)+\sum_{i=1}^{p-1} s_i(k-1)x(k-i)\right\} \\ &= x(k)^T z(k)+\sum_{i=1}^{p-1} s_i(k-1)x(k)^T x(k-i) \\ &= x(k)^T z(k)+s_{p-1}(k-1)^T r_{p-1}(k)\end{aligned}$$ (41)

In the above, $s_{p-1}(k-1)$ is a smoothing coefficient vector and $r_{p-1}(k)$ is a correlation vector, which are defined by the following equations.

$$s_{p-1}(k-1)=[s_1(k-1), s_2(k-1), \ldots, s_{p-1}(k-1)]^T \quad (42)$$

$$r_{p-1}(k)=[x(k)^T x(k-1), x(k)^T x(k-2), \ldots, x(k)^T x(k-p+1)]^T \quad (43)$$

Since the vector $x(k)$, defined by Eq. (3), is given by $$x(k)=[x(k), x(k-1), \ldots, x(k-L+1)]^T \quad (44)$$

the following relationship holds $$x(k)^T x(k-i)=x(k-1)^T x(k-i-1)-x(k-L)x(k-L-i)+x(k)x(k-i) \text{ where } i=1, 2, \ldots, p-1 \quad (45)$$

and the following equation holds $$r_{p-1}(k)=r_{p-1}(k-1)-x(k-L)x_{p-1}(k-L)+x(k)x_{p-1}(k) \quad (46)$$

where $$x_{p-1}(k)=[x(k-1), x(k-2), \ldots, x(k-p+1)]^T \quad (47)$$

Next, a description will be given, with reference to FIG. 5, of the storage of the approximate value $z(k)$ of the estimated transfer function $\hat{h}(k)$ and the transfer function estimation procedure which is followed when the pre-filter coefficients are smoothed. At time k, a correlation calculation part 52, which is supplied with the input signal $x(k)$, calculates the correlation vector $r_{p-1}(k)$ by Eq. (46), using the input signal $x(k)$, previous input values $x(k-1), \ldots,$ x(k–L) and the correlation vector $r_{p-1}(k-1)$ at the immediately preceding time.

Then, an inner product $s_{p-1}(k-1)^T r_{p-1}(k)$ of the correlation vector $r_{p-1}(k)$ and the smoothing coefficient vector $s_{p-1}(k-1)$ of the pre-filter coefficients is calculated in an inner product calculation part 53. A convolution part 54 performs a convolution $x(k)^T z(k)$ of the stored approximate value $z(k)$ of the estimated transfer function and the input signal. The results of the inner product calculation and the convolution are added together in an addition part 57 to synthesize the estimated value $\hat{y}(k)$ of the unknown system output. These operations correspond to the operation of Eq. (41).

Following this, the error e(k) between the unknown system output y(k) and the estimated value $\hat{y}(k)$ is obtained by the subtractor 24 shown in FIG. 2 and the pre-filter coefficient $g_i(k)$ is calculated in the pre-fitter coefficient vector calculation part 31 shown in FIG. 4.

Figure 5:
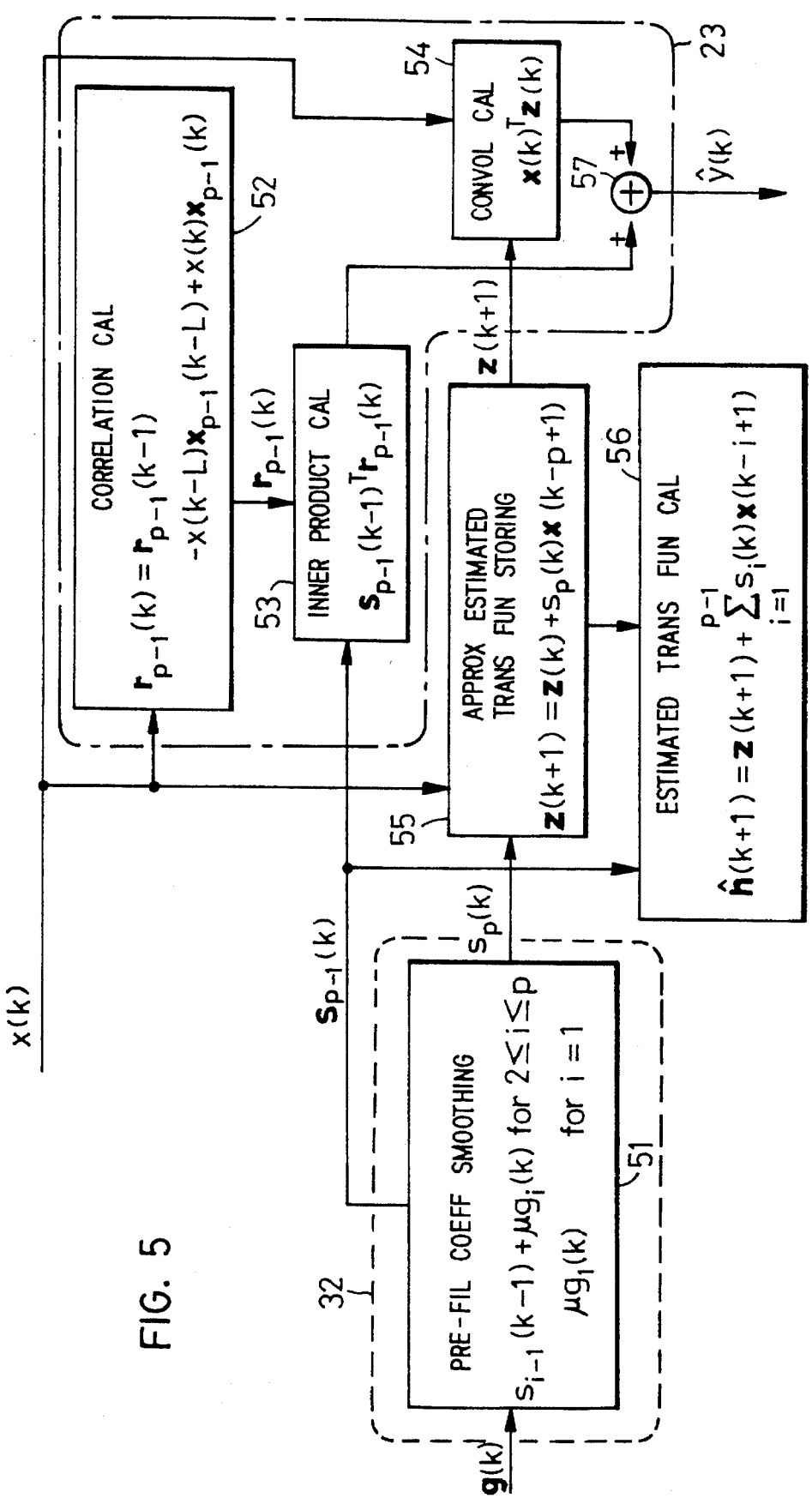
FIG. 5 is a block diagram showing an estimated signal generating process according to the second aspect of the invention.

After this, the calculated pre-filter coefficients are sent to a pre-filter coefficient smoothing part 51 in FIG. 5, wherein they are smoothed to obtain p smoothing coefficients $s_1(k)$, $s_2(k)$, ..., $s_{p-1}(k)$, $s_p(k)$. This smoothing operation is performed on the basis of Eq. (37). Of the smoothing coefficients, $s_1(k)$, $s_2(k)$, ..., $s_{p-1}(k)$ are supplied, as elements of the smoothing coefficient vector $s_{p-1}(k)$, to the inner product calculation part 53 and an estimated transfer function calculation part 56. The smoothing coefficient $s_p(k)$ is fed to an estimated transfer function approximate value storage part 55.

The estimated transfer function approximate value storage part 55 updates the approximate value, using the smoothing coefficient $s_p(k)$ and the input signal vector x(k). That is, $s_p(k)x(k=p+1)$ is added to the approximate value z(k) stored until then and the added result is stored as z(k+1). This operation corresponds to the computation Eq. (40).

Finally, in the estimated transfer calculation part 56 the smoothing coefficient vector $s_{p-1}(k)$ and the input signal vector x(k) are used to calculate Eq. (39) to obtain the estimated transfer function $\hat{h}(k+1)$.

In the above-described operations, rough estimates of computational complexity involved in the respective parts are as follows:
Correlation calculation part 52: 2p
Inner product calculation part 53: p
Convolution part 54: L
Pre-filter coefficient vector calculation part 31: 16p
Pre-filter coefficient smoothing part 51: p
Linear approximate value storage part 55: L
Estimated transfer function calculation part 56: Lp
In the above, p–1 is regarded as nearly equal to p. The entire computational complexity is such as follows:

$$(L+20)p+2L \tag{48}$$

Now, attention should be paid to the following points. With the conventional transfer function estimation method depicted in FIG. 2, the estimated transfer function $\hat{h}(k+1)$ corresponding to the transfer function is calculated at every time and is used to synthesize the estimated value $\hat{y}(k)$ of the unknown system output. In contrast thereto, according to the present embodiment which utilizes the approximate value z(k) of the estimated transfer function, the estimated value $\hat{y}(k)$ of the unknown system output can be synthesized without the need of calculating, directly, the estimated transfer function $\hat{h}(k+1)$ as shown in FIG. 5. Once the estimated value $\hat{y}(k)$ is obtained, the above-described operations can be performed. Accordingly, there is no need of calculating the estimated transfer function at every time in the cases where the estimated value $\hat{h}(k+1)$ of the transfer function, obtained as the result of the long-time estimating operation, is needed and where the estimated value $\hat{y}(k)$ of the unknown system output is needed rather than the estimated result of the transfer function (for example, in the case of the estimation of characteristics of a time-ivariant system or in an acoustic echo canceller).

On this account, the overall computational complexity at every time, except the computational complexity in the estimated transfer function calculation part 56, is as follows:

$$20p+2L \tag{49}$$

As referred to previously with respect to the prior art, the number of operations needed in the past is about 12000 when the tap number L of the filter is 500 and the projection order p is 20. From Eq. (49), however, the number of operations in the present invention is 1380; that is, the computational complexity is reduced to about ⅛ that in the prior art.

As described above, the present invention permits substantial reduction of the computational complexity involved in the conventional projection scheme by the recursive synthesis of the pre-filter coefficient, storage of approximate values of the estimated transfer function vector and smoothing of the pre-filtering coefficients.

While in the above the step size μ has been described to be handled as a scalar, it may also be provided as μA by use of a diagonal matrix A. For example, in the case where the energy of an impulse response of an unknown system decays exponentially, the transfer function estimation speed may sometimes be increased by arranging the elements of the diagonal matrix A as a progression which decays exponentially, as shown below.

$$A=\mathrm{diag}(\alpha, \alpha\gamma, \alpha\gamma^2, \ldots, \alpha\gamma^{L-1}), \quad (0<\gamma<1) \tag{50}$$

In this instance, the input to the linear prediction part is multiplied by a ratio $\gamma^{1/2}$ and $R_p(k)$ Eq. (14) is redefined by the following equation.

$$R_p(k) = \begin{bmatrix} x(k)^T \\ x(k-1)^T \\ \cdot \\ \cdot \\ \cdot \\ x(k-p+1)^T \end{bmatrix} A[x(k)x(k-1)\ldots x(k-o+1)] \tag{51}$$

This correction permits the application of the present invention described above.

Next, a description will be given of examples of application of the transfer function estimating device of the present invention.

Figure 6:
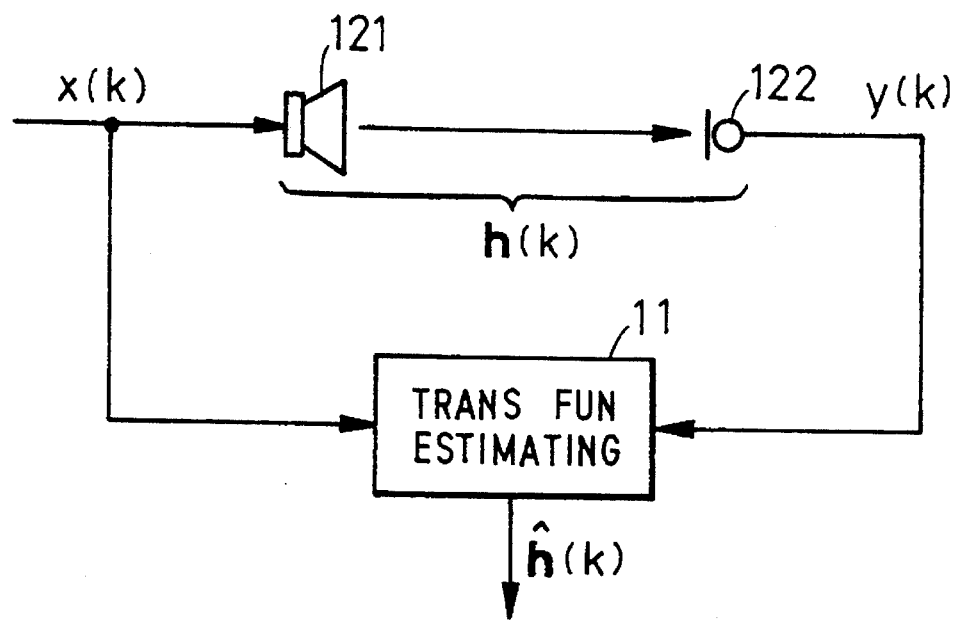
FIG. 6 is a block diagram showing an application of the present invention to measurement of the transfer function of a loudspeaker.

A first example of application is the measurements of transfer functions of pieces of acoustic equipment. FIG. 6 illustrates a system for measuring the transfer function from a loudspeaker to a microphone. In FIG. 6, reference numeral 121 denotes a loudspeaker, 122 a microphone and 11 a transfer function estimating device. The output signal y(k) of the microphone 122 is a signal that has the characteristics of the loudspeaker 121 added to the input signal x(k). Regarding the loudspeaker 121 (including an acoustic path and the microphone as well) as an unknown system, the illustrated system is the same as that shown in FIG. 1, and by connecting the transfer function estimating device 11 of the present invention to the input of the loudspeaker 121 and the output of the microphone 122 as shown in FIG. 6, the transfer function h(k) of the loudspeaker can be estimated as the filter coefficient ĥ(k) of the FIR filter. The measurement is usually performed in an anechoic chamber to avoid the influence of room acoustical characteristics.

Figure 7:
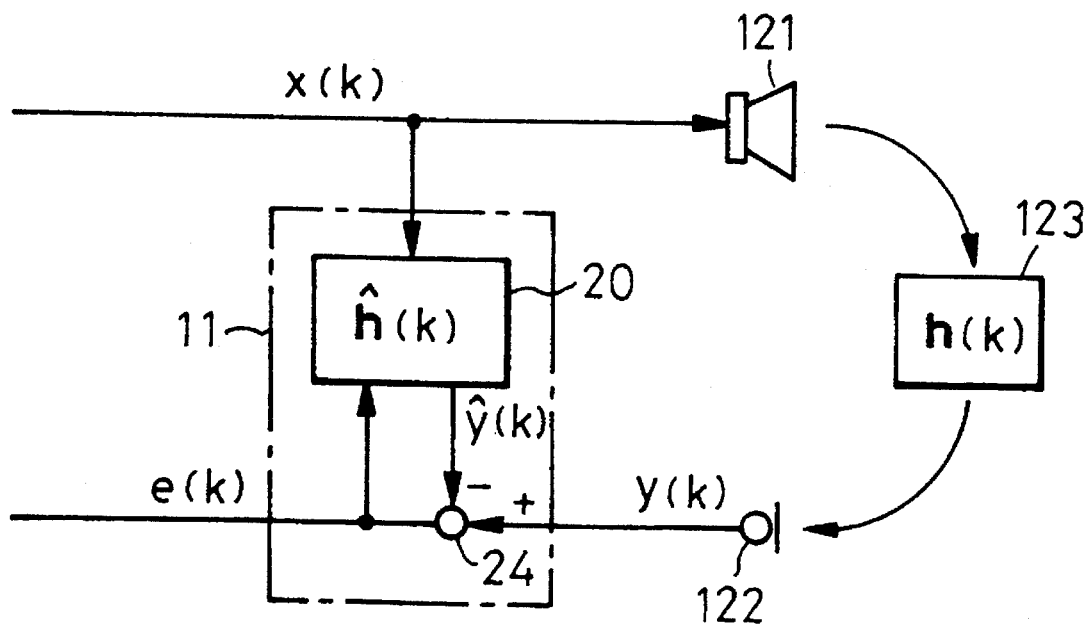
FIG. 7 is a block diagram showing an application of the present invention to an echo canceller.

A second example is an acoustic echo canceller which prevents howling or echo in a loudspeaker communication system such as a TV conference system or visual telephone. FIG. 7 is a diagram for explaining the acoustic echo canceller. In FIG. 7, reference numeral 121 denotes a receiving loudspeaker, 122 a transmitting microphone, 123 a room acoustic system and 20 an estimated echo generating part which is identical in construction with the estimated signal generating part 20 embodying the present invention in FIG. 2. The transfer function estimating device 11 of this embodiment operates as an acoustic echo canceller. In a hands-free communication system using the loudspeaker and the microphone, the other party's voice emanating from the receiving loudspeaker 121 is received by the transmitting loudspeaker via the room acoustic system of the transfer function h(k). The received signal y(k) is returned to the other party and reproduced there. At the other party side, the transmitted voice is sent back and reproduced; this phenomenon is called an acoustic echo and disturbs comfortable communication.

The estimated echo generating part 20 of the acoustic echo canceller 11 estimates the room acoustical characteristics h(k) including characteristics of the loudspeaker and generates an estimated echo signal ŷ(k) based on the characteristics ĥ(k) estimated as those of the input signal x(k). The subtractor 24 subtracts the estimated echo signal ŷ(k) from the received signal y(k). When the estimation is performed well, the echo canceller 11 operates so that it minimizes the power of the error signal e(k) and hence makes the estimated echo signal ŷ(k) nearly equal to the received signal y(k), substantially reducing the acoustic echo.

Comparison of the FIG. 7 system with the FIG. 2 system reveals that the transfer function estimating device of the present invention can be used directly as an echo canceller. The room acoustic system 123 in FIG. 7 corresponds to the unknown system 12 in FIG. 2 and the estimated echo ŷ(k) and the transmitted signal e(k) in FIG. 7 correspond to the output y(k) from the convolution part 23 and the error signal e(k) in FIG. 2, respectively.

Figure 8:
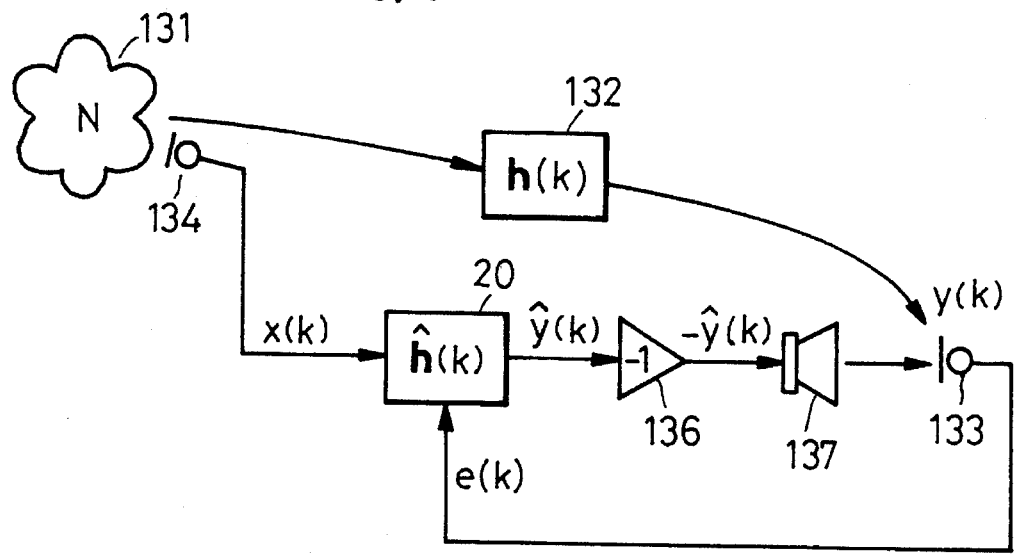
FIG. 8 is a block diagram showing an application of the present invention to noise control.

A third example is noise control. FIG. 8 illustrates the principles of noise control. In FIG. 8, reference numeral 131 denotes a noise source, 132 a noise transfer path expressed by the transfer function h(k), 133 a microphone for observation, 134 a noise monitor microphone, 20 an estimated noise generating part, 136 a phase inverter and 137 a loudspeaker. The purpose of noise control is to cancel noise that is observed via the noise transfer path of the transfer characteristics h(k) from the noise source 131, by generating negative estimated noise (letting a sound pressure be represented by y(k), a sound pressure represented by −y(k) is called a negative sound with respect to y(k)) from the loudspeaker 137.

To attain this object, the transfer characteristics h(k) of the noise transfer path 132 is estimated in the estimated noise generating part 20 of the same construction as that of the estimated signal generating part 20 in FIG. 2. That is, noise is detected by the monitor microphone 134 in the vicinity of the noise source 131 and provided as the input signal x(k) to the estimated noise generating part 20, which generates an estimated value ŷ(k) of the noise signal y(k) at the observation point (i.e. the microphone 133). The estimated noise ŷ(k) is polarity inverted by the phase inverter 136 into a signal −ŷ(k). Assuming, for the sake of brevity, that the loudspeaker characteristics are negligible, the signal −ŷ(k) from the loudspeaker 137 is a combination of the noise signal y(k) and the sound pressure in the microphone 133 at the observation point and the error signal e(k) is provided at the output of the microphone 133. In this instance, when the noise transfer path is estimated well, the signal ŷ(k) becomes similar to the noise y(k) from the noise source 131 and the noise y(k) is cancelled by the combined sound pressure −ŷ(k) from the loudspeaker 137.

The microphone 133 in FIG. 8 corresponds to the subtractor 24 in FIG. 2; accordingly, the systems of FIGS. 8 and 2 differ only in whether the error signal generated outside the estimating device 11 is provided thereto or the error signal is calculated in the estimating device 11. The principles of the present invention are applicable to the noise control device of FIG. 8.

In the measurement of the transfer characteristics of the loudspeaker shown in FIG. 6, the loudspeaker characteristics do not change with time; hence, there is no need of learning measured results (transfer characteristics) in the course of measurement and the transfer characteristics need only to be made known as the result of measurement conducted after a certain period of time. In the acoustic echo canceller shown in FIG. 7, the room transfer function varies with time in response to movement of audiences or opening and closing of a door, for instance. As is evident from FIG. 7, however, the purpose of the acoustic echo canceller is attained by obtaining the estimated value ŷ(k) of the output y(k) of the room transfer function (the unknown system). Therefore, the estimated value ĥ(k) of the room transfer function itself is unnecessary in the acoustic echo canceller. Also in the noise control device of FIG. 8, its purpose can be attained by obtaining the estimated value ŷ(k) of the unknown system and no estimated value of the room transfer function itself is needed.

As will be appreciated from the above, the transfer function estimating device of the present invention, when applied as described above, permits substantial reduction of the computational complexity as compared with the prior art. Furthermore, the present invention has a basic feature of minimizing the power of the error signal e(k) in such a system configuration as shown in FIG. 2. Thus, the present invention is applicable to all instances in which problems to be solved can be modelled as the error signal power minimizing problem shown in FIG. 2.

In the embodiments described above, it will be effective to select the elements of the diagonal matrix A of Eq. (50) so that they provide the same attenuation as the room reverberation.

Figure 9:
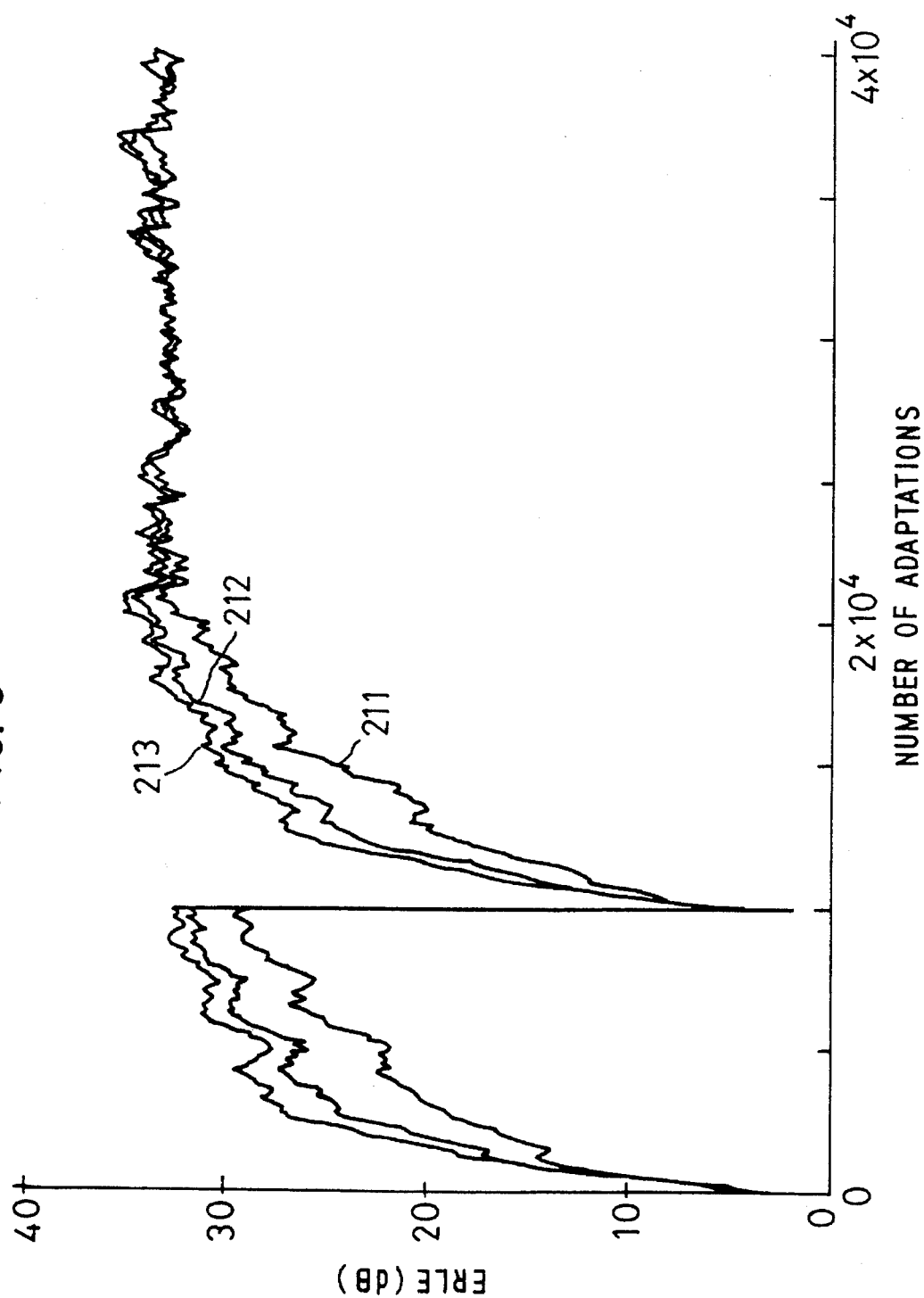
FIG. 9 is a graph showing echo cancelling characteristics of an echo canceller embodying the present invention.

Finally, a description will be given of experimental results of the acoustic echo canceller according to the present invention. FIG. 9 shows what are called learning curves, the ordinate representing echo return loss enhancement (hereinafter referred to as ERLE) and the abscissa respresenting time. As the estimation of the room transfer function proceeds with the lapse of time, the ERLE increases. In FIG. 9, the curve 211 is a learning curve in the case of the projection order p being 2, the curve 212 a learning curve in the case of the projection order p being 8 and the curve 213 a learning curve in the case of the projection order p being 32. It will be understood, from FIG. 9, that the larger the projection order, the higher the convergence speed (the ERLE increases in a short period of time).

Figure 10:
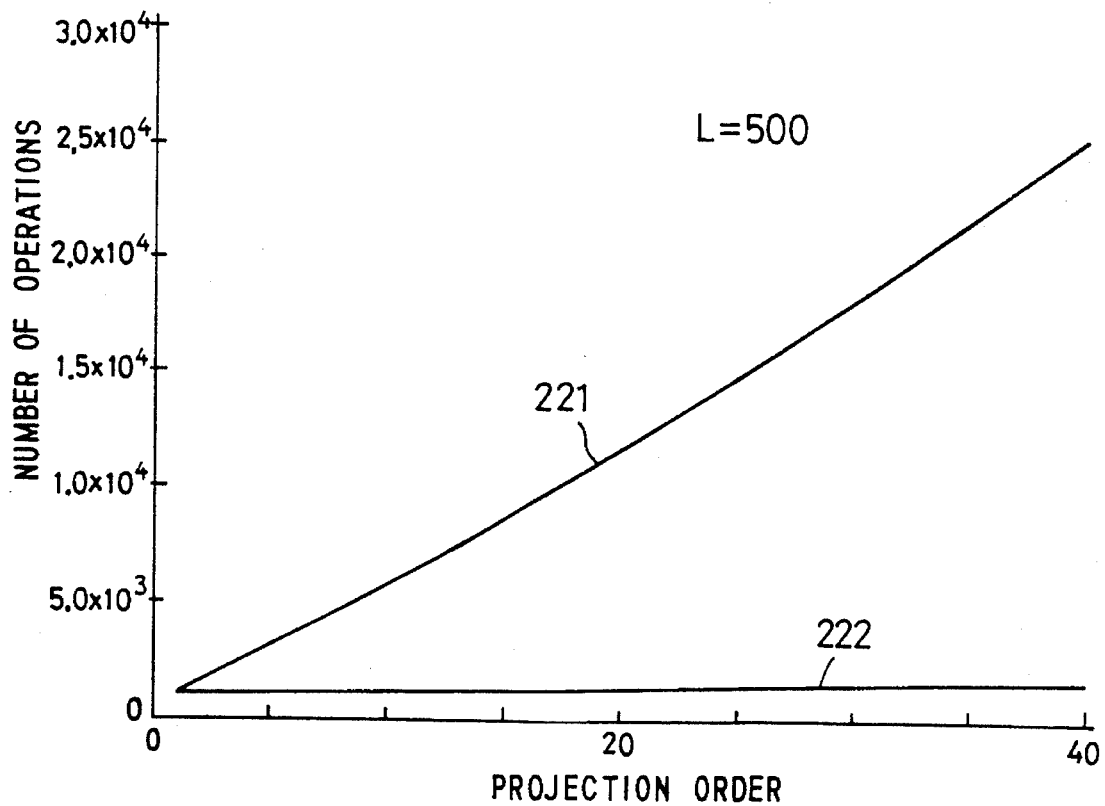
FIG. 10 is a graph showing, in comparison with a prior art example, the relationship between the number of operations for the estimation of the transfer function and the projection order.

FIG. 10 is a graph showing the relationship between the projection order p and the required computational complexity, the abscissa representing the projection order p and the ordinate the number of multiply-add operations (including add operations as well). In FIG. 10, the curve 221 indicates the computational complexity in the prior art and the curve 222 the computational complexity when the present invention was used. The tap number L of the FIR filter for use in the estimation of the transfer function was 500. From FIG.

10 it will be seen that the computational complexity involved in the present invention is much smaller than in the case of the prior art when the projection order p is large.

As described above, the present invention permits substantial reduction of the number of operations necessary for the estimation of the transfer function or output of an unknown system by the projection scheme. In concrete terms, letting the tap length of the FIR filter which represents the unknown system and the projection order be represented by L and p, respectively, the prior art requires multiply-add operations $p^3/6+(p+1)L$, that is, the computational complexity is proportional to $p^3$, whereas according to the present invention the computation complexity can be reduced to $20p+2L$.

Such a reduction of computational complexity allows corresponding reduction in the scale of hardware, and hence significantly contributes to the downsizing of the device and reduction of its cost. Moreover, when the hardware is held on the same scale, the tap length L and the projection order can be chosen larger than in the past—this speeds up the estimating operation and increases the estimation accuracy. Besides, when the present invention is embodied by a computer, the operation time can be greatly shortened.

It will be apparent that many modifications and variations may be effected without departing from the scope of the novel concepts of the present invention.

What is claimed is:

1. A method for adaptive estimation of an acoustic transfer function of an unknown system, comprising the steps of:
   (1) calculating an error signal $e(k)=y(k)-\hat{y}(k)$ between an estimated output signal $\hat{y}(k)$ of the unknown system and an output signal $y(k)$ produced by the unknown system in response to an input signal $x(k)$;
   (2) computing a forward linear prediction coefficient vector $a(k)$ of said input signal $x(k)$, the sum of forward posteriori prediction error squares $F(k)$ of said input signal $x(k)$, a backward linear prediction coefficient vector $b(k)$ of said input signal $x(k)$ and the sum of backward posterior prediction error squares $B(k)$;
   (3) obtaining a pre-filter coefficient vector $g(k)$ by a recursion formula expressed by the following first and second equations using a pre-filter deriving coefficient vector $f(k)$:

$$g(k) = (1-\mu)\begin{bmatrix} 0 \\ f(k-1) \end{bmatrix} + \frac{a(k)^T e(k)}{F(k)} a(k)$$

$$\begin{bmatrix} f(k-1) \\ 0 \end{bmatrix} = g(k-1) - \frac{b(k-1)^T e(k-1)}{B(k-1)} b(k-1)$$

where $e(k)$ and $\mu$ represent a vector of said error signal $e(k)$ and a predetermined correcting step size, respectively; and
   (4) repeatedly correcting an estimated transfer function $\hat{h}(k)$ of the unknown system by the following equation $$\hat{h}(k+1)=\hat{h}(k)+\mu\delta\hat{h}(k)$$

to cause said error signal $e(k)$ to approach zero using an estimated transfer function correcting vector $\delta\hat{h}(k)$ expressed by the following equation $$\delta\hat{h}(k)=[x(k),x(k-1),\ldots,x(k-p+1)]g(k)$$

where $x(k)$ represents a vector of said input signal $x(k)$.

2. A method for adaptive estimation of an acoustic transfer function of an unknown system, comprising the steps of:
   (1) calculating an error signal $e(k)=y(k)-\hat{y}(k)$ between an estimated output signal $\hat{y}(k)$ of the unknown system and an output signal $y(k)$ produced by the unknown system in response to an input signal $x(k)$;
   (2) obtaining a pre-filter coefficient vector $g(k)$ composed of pre-filter coefficients $g_i(k)$ by solving the following simultaneous linear equation with p unknowns $$R_p(k)g(k)=e(k)$$

where $R_p(k)$ represents a covariance matrix of said input signal $x(k)$ and $e(k)$ represents a vector of said error signal $e(k)$;
   (3) smoothing said pre-filter coefficients $g_i(k)$ by the following equations $$\begin{aligned} s_i(k) &= s_{i-1}(k-1) + \mu g_i(k) & \text{for } 2 \leq i \leq p \\ &= \mu g_1(k) & \text{for } i = 1 \end{aligned}$$

to obtain a smoothing coefficient $s_i(k)$;
   (4) obtaining an approximate estimated transfer function $z(k+1)$ as an approximation of said estimated transfer function $\hat{h}(k)$ using said smoothing coefficient $s_p(k)$ based on the following equation $$z(k+1)=z(k)+s_p(k)x(k-p+1);$$

(5) calculating convolution $x(k)^T z(k)$ of said approximate estimated transfer function $z(k)$ with said input signal $x(k)$;
   (6) calculating an inner product $s_{p-1}(k-1)^T r_{p-1}(k)$, setting the vector of said smoothing coefficient $s_i(k)$ and the correlation vector $r_{p-1}(k)$ of said input signal to $$s_{p-1}(k-1)=[s_1(k-1), s_2(k-1), \ldots, s_{p-1}(k-1)]^T$$

and $$r_{p-1}(k)=[x(k)^T x(k-1), x(k)^T x(k-2), \ldots, x(k)^T x(k-p+1)]^T$$

respectively; and
   (7) obtaining the sum of said convolution result $x(k)^T z(k)$ and said inner product as said estimated output signal $\hat{y}(k)$.

3. The method of claim 1 or 2, wherein, letting the last element of said pre-filter coefficient vector $g(k-1)$ be represented by $g_p(k-1)$, said pre-filter coefficient vector $g(k)$ is calculated using the following equation which is a modified version of said second equation:

$$\begin{bmatrix} f(k-1) \\ 0 \end{bmatrix} = g(k-1) - g_p(k-1)b(k-1).$$

4. The method of claim 1 or 2, wherein, letting predetermined two non-negative numbers be represented by $\delta_F(k)$ and $\delta_B(k-1)$, said pre-filter coefficient vector $g(k)$ is calculated by the following equations which are modified versions of said first and second equations:

$$g(k) = (1-\mu)\begin{bmatrix} 0 \\ f(k-1) \end{bmatrix} + \frac{a(k)^T e(k)}{F(k)+\delta_F(k)} a(k)$$

$$\begin{bmatrix} f(k-1) \\ 0 \end{bmatrix} = g(k-1) - \frac{b(k-1)^T e(k-1)}{B(k-1)+\delta_B(k-1)} b(k-1).$$

5. A method for adaptive estimation of an acoustic transfer function of an unknown system, comprising the steps of:

(1) calculating an error signal $e(k)=y(k)-\hat{y}(k)$ between an estimated output signal $\hat{y}(k)$ of the unknown system and an output signal $y(k)$ produced by said unknown system in response to an input signal $x(k)$;

(2) computing a forward linear prediction coefficient vector $a(k)$ of said input signal $x(k)$, the sum of forward posteriori prediction error squares $F(k)$ of said input signal $x(k)$, a backward linear prediction coefficient vector $b(k)$ of said input signal $x(k)$ and the sum of backward posterior prediction error squares $B(k)$;

(3) obtaining a pre-filter coefficient vector $g(k)$ by a recursion formula expressed by the following first and second equations using a pre-filter deriving coefficient vector $f(k)$:

$$g(k) = (1-\mu)\begin{bmatrix} 0 \\ f(k-1) \end{bmatrix} + \frac{a(k)^T e(k)}{F(k)} a(k)$$

$$\begin{bmatrix} f(k-1) \\ 0 \end{bmatrix} = g(k-1) - \frac{b(k-1)^T e(k-1)}{B(k-1)} b(k-1)$$

where $e(k)$ and $\mu$ represent a vector of said error signal $e(k)$ and a predetermined correcting step size, respectively;

(4) smoothing said pre-filter coefficients $g_i(k)$ of said pre-filter coefficient vector $g(k)$ by the following equations $$s_i(k)=s_{i-1}(k-1)+\mu g_i(k) \text{ for } 2 \leq i \leq p = \mu g_1(k) \text{ for } i=1$$

to obtain a smoothing coefficient $s_i(k)$;

(5) obtaining an approximate estimated transfer function $z(k+1)$ as an approximation of said estimated transfer function $\hat{h}(k)$ using said smoothing coefficient $s_p(k)$ based on the following equation $$z(k+1)=z(k)+s_p(k)x(k-p+1);$$

(6) calculating convolution $x(k)^T z(k)$ of said approximate estimated transfer function $z(k)$ with said input signal $x(k)$;

(7) calculating an inner product $s_{p-1}(k-1)^T r_{p-1}(k)$, setting the vector of said smoothing coefficient $s_i(k)$ and the correlation vector $r_{p-1}(k)$ of said input signal to $$s_{p-1}(k-1)=[s_1(k-1), s_2(k-1), \ldots, s_{p-1}(k-1)]^T$$

and $$r_{p-1}(k)=[x(k)^T x(k-1), x(k)^T x(k-2), \ldots, x(k)^T x(k-P+1)]^T$$

respectively; and (8) obtaining the sum of said convolution result $x(k)^T z(k)$ and said inner product as said estimated output signal $\hat{y}(k)$.

6. The method of claim 2 or 5, wherein said inner product calculating step includes a step of calculating said correlation vector $r_{p-1}$ of said input signal $x(k)$ by $$r_{p-1}(k)=r_{p-1}(k-1)-x(k-L)x_{p-1}(k-L)+x(k)x_{p-1}(k)$$

where L represents a tap number of said convolution and $x_{p-1}(k)$ represents the vector of said input signal $x(k)$ expressed as $$x_{p-1}(k)=[x(k-1), x(k-2), \ldots, x(k-p+1)]^T.$$

7. A device for adaptive estimation of an acoustic transfer function of an unknown system, comprising:

convolution means for convolving an input signal $x(k)$ with an estimated transfer function vector $\hat{h}(k)$ representing the unknown system and outputting an estimated output signal $\hat{y}(k)$ of said unknown system;

error calculating means for calculating an error signal $e(k)=y(k)-\hat{y}(k)$ between said estimated output signal $\hat{y}(k)$ of the unknown system and said output signal $y(k)$ from said unknown system;

linear prediction means for computing a forward linear prediction coefficient vector $a(k)$ of said input signal $x(k)$, the sum of forward posteriori prediction error squares $F(k)$ of said input signal $x(k)$, a backward linear prediction coefficient vector $b(k)$ of said input signal $x(k)$ and the sum of backward posteriori prediction error squares $B(k)$;

pre-filter coefficient vector correcting means for obtaining a pre-filter coefficient vector $g(k)$ by a recursion formula expressed by the following first and second equations using a pre-filter deriving coefficient vector $f(k)$:

$$g(k) = (1-\mu)\begin{bmatrix} 0 \\ f(k-1) \end{bmatrix} + \frac{a(k)^T e(k)}{F(k)} a(k)$$

$$\begin{bmatrix} f(k-1) \\ 0 \end{bmatrix} = g(k-1) - \frac{b(k-1)^T e(k-1)}{B(k-1)} b(k-1)$$

where $e(k)$ and $\mu$ represent a vector of said error signal $e(k)$ and a predetermined correcting step size, respectively; and pre-filter deriving coefficient vector correcting means for repeatedly correcting said estimated transfer function $\hat{h}(k)$ by the following equation $$\hat{h}(k+1)=\hat{h}(k)+\mu\delta\hat{h}(k)$$

to cause said error signal $e(k)$ to approach zero using an estimated transfer function correcting vector $\delta\hat{h}(k)$ expressed by the following equation $$\delta\hat{h}(k)=[x(k), x(k-1), \ldots, x(k-p+1)]g(k)$$

where, $x(k)$ represents a vector of said input signal $x(k)$.

8. The device of claim 7, wherein said pre-filter deriving coefficient vector correcting means is means which, letting the last element of said pre-filter coefficient vector $g(k-1)$ be represented by $g_p(k-1)$, calculates said pre-filter coefficient vector $g(k)$ by the following equation which is a modified version of said second equation:

$$\begin{bmatrix} f(k-1) \\ 0 \end{bmatrix} = g(k-1) - g_p(k-1)b(k-1).$$

9. The device of claim 7, wherein, letting predetermined non-negative numbers be represented by $\delta_F(k)$ and $\delta_B(k-1)$, respectively, said pre-filter coefficient vector correcting means and said pre-filter deriving coefficient vector correcting means calculate said pre-filter coefficient vector $g(k)$ by the following equations, respectively, which are modified versions of said first and second equations:

$$g(k) = (1-\mu)\begin{bmatrix} 0 \\ f(k-1) \end{bmatrix} + \frac{a(k)^T e(k)}{F(k)+\delta_F(k)} a(k)$$

$$\begin{bmatrix} f(k-1) \\ 0 \end{bmatrix} = g(k-1) - \frac{b(k-1)^T e(k-1)}{B(k-1)+\delta_B(k-1)} b(k-1).$$

10. The device of claim 7, further comprising subtracting means for providing, as said error signal $e(k)$, the difference $y(k)-\hat{y}(k)$ between said output signal $y(k)$ of said unknown system and said estimated signal $\hat{y}(k)$ which is the output of said estimated system.

11. A device for adaptive estimation of an acoustic transfer function of an unknown system, comprising:

error calculating means for calculating an error signal $e(k)=y(k)-\hat{h}(k)$ between an estimated output signal $\hat{h}(k)$ of the unknown system and an output signal $y(k)$ produced by said unknown system in response to an input signal $x(k)$;

pre-filter coefficient vector calculating means for calculating a pre-filter coefficient vector $g(k)$ composed of pre-filter coefficients $g_i(k)$ by solving the following simultaneous linear equation with p unknowns $$R_p(k)g(k)=e(k)$$

where $R_p(k)$ represents a covariance matrix of said input signal $x(k)$ and $e(k)$ represents a vector of said error signal $e(k)$;

pre-filter coefficient smoothing means for smoothing said pre-filter coefficients $g_i(k)$ by the following equations $$\begin{aligned}s_i(k) &= s_{i-1}(k-1)+\mu g_i(k) & \text{for } 2 \leq i \leq p \\ &= \mu g_1(k) & \text{for } i=1\end{aligned}$$

to obtain a smoothing coefficient $s_i(k)$;

approximate estimated transfer function calculating means for obtaining an approximate estimated transfer function $z(k+1)$ as an approximation of said estimated transfer function $\hat{h}(k)$ using said smoothing coefficient $s_p(k)$ based on the following equation $$z(k+1)=z(k)+s_p(k)x(k-p+1);$$

convolution calculating means for calculating convolution $x(k)^T z(k)$ of said approximate estimated transfer function $z(k)$ and said input signal $x(k)$;

inner product calculating means for calculating an inner product $s_{p-1}(k-1)^T r_{p-1}(k)$, setting the vector of said smoothing coefficient $s_i(k)$ and the correlation vector of said input signal to $$s_{p-1}(k-1)=[s_1(k-1), s_2(k-1), \ldots, s_{p-1}(k-1)]^T$$

and $$r_{p-1}(k)=[x(k)^T x(k-1), x(k)^T x(k-2), \ldots, x(k)^T x(k-p+1)]^T$$

respectively; and adding means for obtaining the sum of said convolution result $x(k)^T z(k)$ and said inner product as said estimated output signal $\hat{y}(k)$.

12. A device for adaptive estimation of an acoustic transfer function of an unknown system, comprising:

error calculating means for calculating an error signal $e(k)=y(k)-\hat{y}(k)$ between an estimated output signal $\hat{y}(k)$ of the unknown system and an output signal $y(k)$ produced by said unknown system in response to an input signal $x(k)$;

linear prediction means for computing a forward linear prediction coefficient vector $a(k)$ of said input signal $x(k)$, the sum of forward posteriori prediction error squares $F(k)$ of said input signal $x(k)$, a backward linear prediction coefficient vector $b(k)$ of said input signal $x(k)$ and the sum of backward posterior prediction error squares $B(k)$;

pre-filter coefficient vector correcting means for obtaining a pre-filter coefficient vector $g(k)$ by a recursion formula expressed by the following first and second equations using a pre-filter deriving coefficient vector $f(k)$:

$$g(k)=(1-\mu)\begin{bmatrix}0\\f(k-1)\end{bmatrix}+\frac{a(k)^T e(k)}{F(k)}a(k)$$

$$\begin{bmatrix}f(k-1)\\0\end{bmatrix}=g(k-1)-\frac{b(k-1)^T e(k-1)}{B(k-1)}b(k-1)$$

where $e(k)$ and $\mu$ represent a vector of said error signal $e(k)$ and a predetermined correcting step size, respectively;

pre-filter coefficient smoothing means for smoothing said pre-filter coefficients $g_i(k)$ by the following equations $$\begin{aligned}s_i(k) &= s_{i-1}(k-1)+\mu g_i(k) & \text{for } 2 \leq i \leq p \\ &= \mu g_1(k) & \text{for } i=1\end{aligned}$$

to obtain a smoothing coefficient $s_i(k)$;

approximate estimated transfer function calculating means for obtaining an approximate estimated transfer function $z(k+1)$ as an approximation of said estimated transfer function $\hat{h}(k)$ using said smoothing coefficient $s_p(k)$ based on the following equation $$z(k+1)=z(k)+s_p(k)x(k-p+1);$$

convolution calculating means for calculating convolution $x(k)^T z(k)$ of said approximate estimated transfer function $z(k)$ and said input signal $x(k)$;

inner product calculating means for calculating an inner product $s_{p-1}(k-1)^T r_{p-1}(k)$ setting the vector of said smoothing coefficient $s_i(k)$ and the correlation vector of said input signal to $$s_{p-1}(k-1)=[s_1(k-1), s_2(k-1), \ldots, s_{p-1}(k-1)]^T$$

and $$r_{p-1}(k)=[x(k)^T x(k-1), x(k)^T x(k-2), \ldots x(k)^T x(k-p+1)]^T$$

respectively; and adding means for obtaining the sum of said convolution result $x(k)^T z(k)$ and said inner product as said estimated output signal $\hat{y}(k)$.

13. The device of claim 11 or 12, wherein said inner product calculating means includes correlation calculating means for calculating correlation vector $r_{p-1}(k)$ of said input signal $x(k)$ by $$r_{p-1}(k)=r_{p-1}(k-1)-x(k-L)x_{p-1}(k-L)+x(k)x_{p-1}(k)$$

where L represents a tap number of said convolution and $x_{p-1}(k)$ represents the vector of said input signal $x(k)$ expressed as $$x_{p-1}(k)=[x(k-1), x(k-2), \ldots, x(k-p+1)]^T.$$

* * * * *